United States Patent
Kelly et al.

(10) Patent No.: US 7,743,020 B2
(45) Date of Patent: Jun. 22, 2010

(54) AUTOMATIC INSTANCE DATA MAPPING GENERATION

(75) Inventors: Kevin Edward Kelly, Raleigh, NC (US); Jan Joseph Kratky, North Hills, NC (US); Steven Keith Speicher, Apex, NC (US); Keith Allen Wells, Angier, NC (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 11/266,118

(22) Filed: Nov. 3, 2005

(65) Prior Publication Data

US 2007/0100897 A1    May 3, 2007

(51) Int. Cl.
G06F 12/00 (2006.01)
G06F 17/30 (2006.01)
G06F 9/44 (2006.01)

(52) U.S. Cl. .................. 707/610; 717/168; 717/172
(58) Field of Classification Search .......... 707/200, 707/102, 999.2, 999.102; 717/168, 172, 717/182
See application file for complete search history.

(56) References Cited

U.S. PATENT DOCUMENTS

| | | | | |
|---|---|---|---|---|
| 5,999,947 | A * | 12/1999 | Zollinger et al. | 707/203 |
| 6,151,608 | A * | 11/2000 | Abrams | 707/204 |
| 6,567,823 | B1 * | 5/2003 | Rothschild | 707/104.1 |
| 7,293,253 | B1 * | 11/2007 | Soukup | 717/108 |
| 7,313,792 | B2 * | 12/2007 | Buban et al. | 717/170 |
| 7,458,073 | B1 * | 11/2008 | Darling et al. | 717/168 |
| 2006/0136904 | A1 * | 6/2006 | Weidman et al. | 717/172 |
| 2006/0288344 | A1 * | 12/2006 | Brodersen et al. | 717/168 |

* cited by examiner

Primary Examiner—James Trujillo
Assistant Examiner—Bruce M Moser
(74) Attorney, Agent, or Firm—VanLeeuwen & VanLeeuwen (57) ABSTRACT

An object of the present invention is to create a migration mapping definition based upon computer program changes and use the migration mapping definition to migrate instance data from an older software version format to a newer software version format. A developer uses edit commands, such as mouse commands and keyboard commands, to update a computer program. For example, a software developer may upgrade "Application XYZ" from version 1.0 to version 2.0 in order to include a simpler approach to import images, as well as the ability to import newer image format types. As a developer updates a computer program using edit commands, the edit commands are stored in a migration mapping definition. In turn, the migration mapping definition is deployed, along with the updated computer program, to an end user. The end user then uses the migration mapping definition to migrate instance data generated by the original computer program to instance data that is usable by the updated computer program.

15 Claims, 7 Drawing Sheets

AUTOMATIC INSTANCE DATA MAPPING GENERATION

BACKGROUND OF THE INVENTION

1. Technical Field

The present invention relates to a system and method for automatic instance data mapping generation. More particularly, the present invention relates to a system and method for creating a migration mapping definition based upon model changes, and using the migration mapping definition to migrate instance data from an older software version to a newer software version.

2. Description of the Related Art

Software developers are continuously updating software application programs by providing new features in the application in order to gain a competitive advantage. For example, a software developer may upgrade application "XYZ" from version 1.0 to version 2.0 in order to include a simpler approach for importing images, as well as the ability to import newer image format types.

When a software developer updates an application version, the software developer also develops a migration product, which may be a migration application or migration adapters. These migration products allow an end user to migrate data that is generated on an older software version to a newer software version. Using the example described above, the software developer may provide a migration application that allows an end user to migrate data that was generated on application XYZ version 1.0 to a data format that is compatible with application XYZ version 2.0. A challenge found, however, is that creating these migration products requires additional effort from the software developer.

Today, software developers typically use an integrated development environment (IDE) to develop software applications that are based upon models. A software developer uses the IDE to generate the model that, in turn, is the backbone behind the application. The IDE's, however, have complex frameworks for interchanging tool data and metadata information. This information is not always complete or collected in such a way in order to automatically generate a migration application. A challenge found, therefore, is that data modelers are still required to manually write the migration applications or migration adapters that enable a user to migrate data from earlier software versions to newer software versions.

What is needed, therefore, is a system and method for automatically generating a migration product that migrates data from an earlier software version to a newer software version.

SUMMARY

It has been discovered that the aforementioned challenges are resolved using a system and method for creating a migration mapping definition based upon model update changes, and using the migration mapping definition to migrate instance data from an older software version format to a newer software version format. As a developer updates a model using edit commands, the edit commands are stored in a migration mapping definition. In turn, the migration mapping definition is deployed, along with the updated model, to an end user. The end user is able to use the migration mapping definition to migrate instance data generated by the original model to instance data that is usable by the updated model.

A developer invokes edit commands and updates an original model, which may correspond to a particular application. For example, the original model may correspond to a "version 1.0" customer address tracking program, and the developer wishes to add features to the program, which upgrades the program to "version 2.0." The edit commands may include mouse commands and keyboard commands to modify the original model, such as separating or combining fields. As the developer invokes the edit commands, the edit commands are stored in a migration mapping definition. When the developer is finished updating the original model, the developer deploys the updated model, along with the migration mapping definition, to an end user. In one embodiment, the developer verifies the migration mapping definition and includes minor changes before deploying the migration mapping definition.

The end user receives the migration mapping definition and the updated model, and loads them onto a model-driven framework, such as the Eclipse Modeling Framework (EMF). The framework may include the original model, which the end user previously used to generate "original instance data," such as a customer address database. Since the end user's framework now includes the updated model, the end user wishes to migrate the original instance data to a format that the updated model understands.

In order to perform the instance data migration, the user invokes a migration engine (e.g., software subroutine), which loads the migration mapping definition. After loading the migration mapping definition, the migration engine scans the original instance data for "elements" (e.g., fields). Once the migration engine identifies an element, the migration engine analyzes the migration mapping definition to determine whether to convert the particular element to a different format or copy the element's corresponding data "as is." For example, the original instance data may include a name field that includes a first name and a last name. In this example, the developer may have reformatted the field into two fields, in which the first field corresponds to a first name and the second field corresponds to a last name.

When the migration mapping definition includes conversion commands for the identified field, the migration engine performs the conversion and stores the converted data in the migrated instance data. When the migration mapping definition does not specify conversion commands, the migration engine copies the element's corresponding data "as is" over to the migrated instance data. The migration engine continues to scan the original instance data and migrate element data accordingly. When the migration engine is finished scanning the original instance data, the end user invokes the updated model, which displays the migrated instance data.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
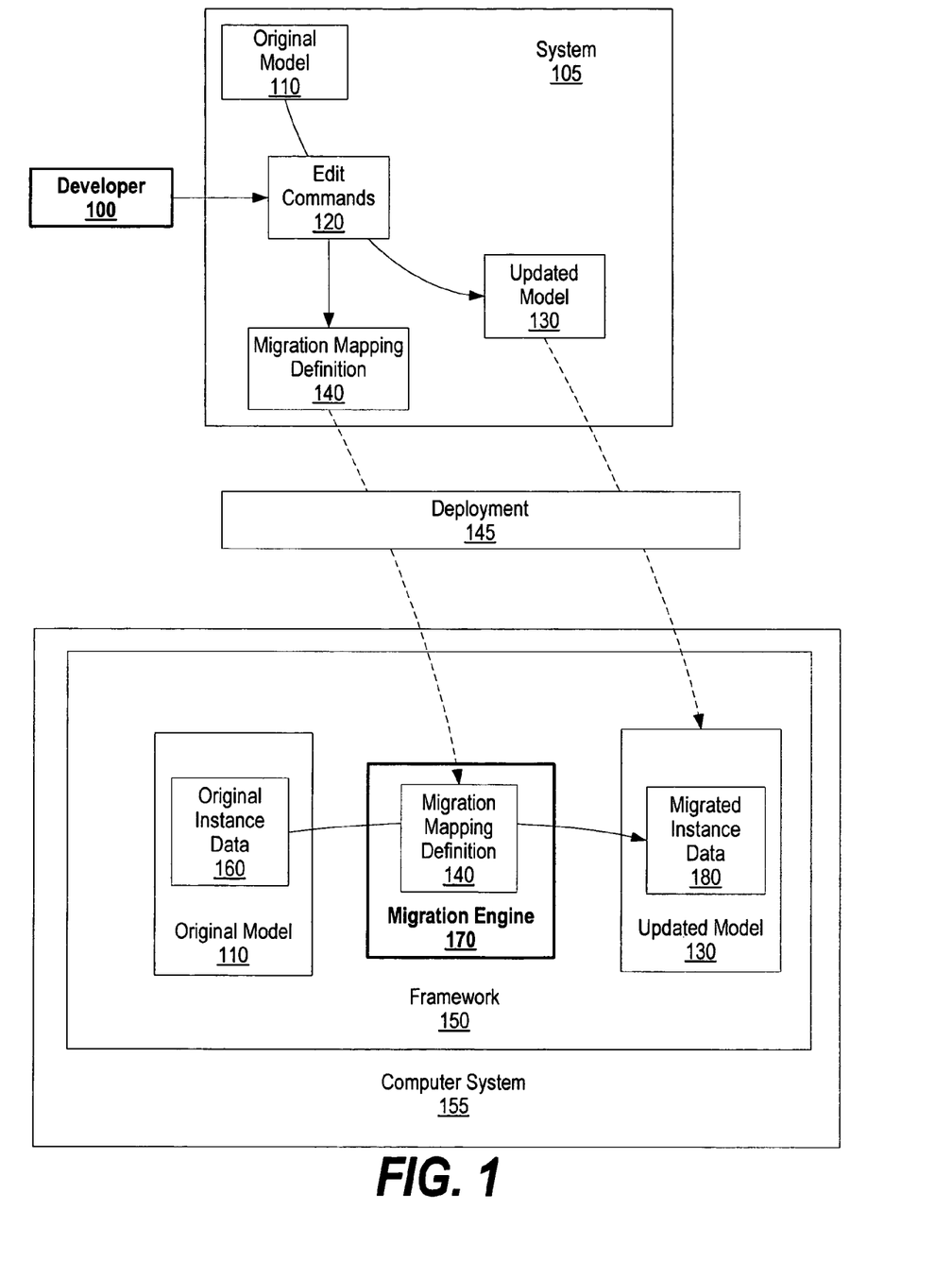
FIG. 1 is a diagram showing a developer updating a model using edit commands, and a migration engine migrating instance data that is based upon the edit commands.

FIG. 1 is a diagram showing a developer updating a model using edit commands, and a migration engine migrating instance data that is based upon the edit commands. Developer 100 uses system 105 to update original model 110, which corresponds to a particular application. For example, original model 110 may correspond to a "version 1.0" customer address tracking program, and developer 100 wishes to add features to the program and update its version to "version 2.0."

Developer 100 modifies original model 110 using edit commands 120. For example, the edit commands may include mouse commands and keyboard commands to modify original model 110, such as separating or combining fields. As developer 100 invokes edit commands 120, edit commands 120 are stored in migration mapping definition 140. When developer 100 is finished updating original model 110, developer 100 deploys (deployment 145) updated model 130 and migration mapping definition 140. In one embodiment, developer 100 verifies migration mapping definition 140 and generates minor changes before deployment.

A user receives migration mapping definition 140 and updated model 130, and loads them onto framework 150, which is located on the user's computer system (computer system 155). Framework 150 is a model-driven framework, such as the Eclipse Modeling Framework (EMF). Framework 150 may include original model 110, which the user previously used to generate original instance data 160, such as a customer address database. Since framework 150 now includes updated model 130, the user wishes to migrate original instance data 160 to a format that is understandable by updated model 130.

In order to perform the instance data migration, the user invokes migration engine 170 (e.g., software subroutine), which loads migration mapping definition 140. When loaded, migration engine 170 scans original instance data 160 for elements. Once it identifies an element, migration engine 170 analyzes migration mapping definition 140 to determine whether to use a transformer to convert the particular element's corresponding data to a different format. For example, original instance data 160 may include a name field that includes a first name and a last name. Continuing with this example, developer 100 may have reformatted the field into two fields, in which the first field is for the first name and the second field is for the last name. In this example, migration mapping definition 140 includes the particular edit commands to split one name field into two name fields.

If migration mapping definition 140 includes conversion commands for the identified field that is included in original instance data 160, migration engine 170 performs the conversion and stores the converted data in migrated instance data 180. When migration mapping definition 140 does not specify conversion commands, migration engine 170 copies the element's corresponding data "as is" over to migrated instance data 180.

After migration engine 170 is finished scanning original instance data 160, the user may invoke updated model 130 and display migrated instance data 180 to the user.

Figure 2:
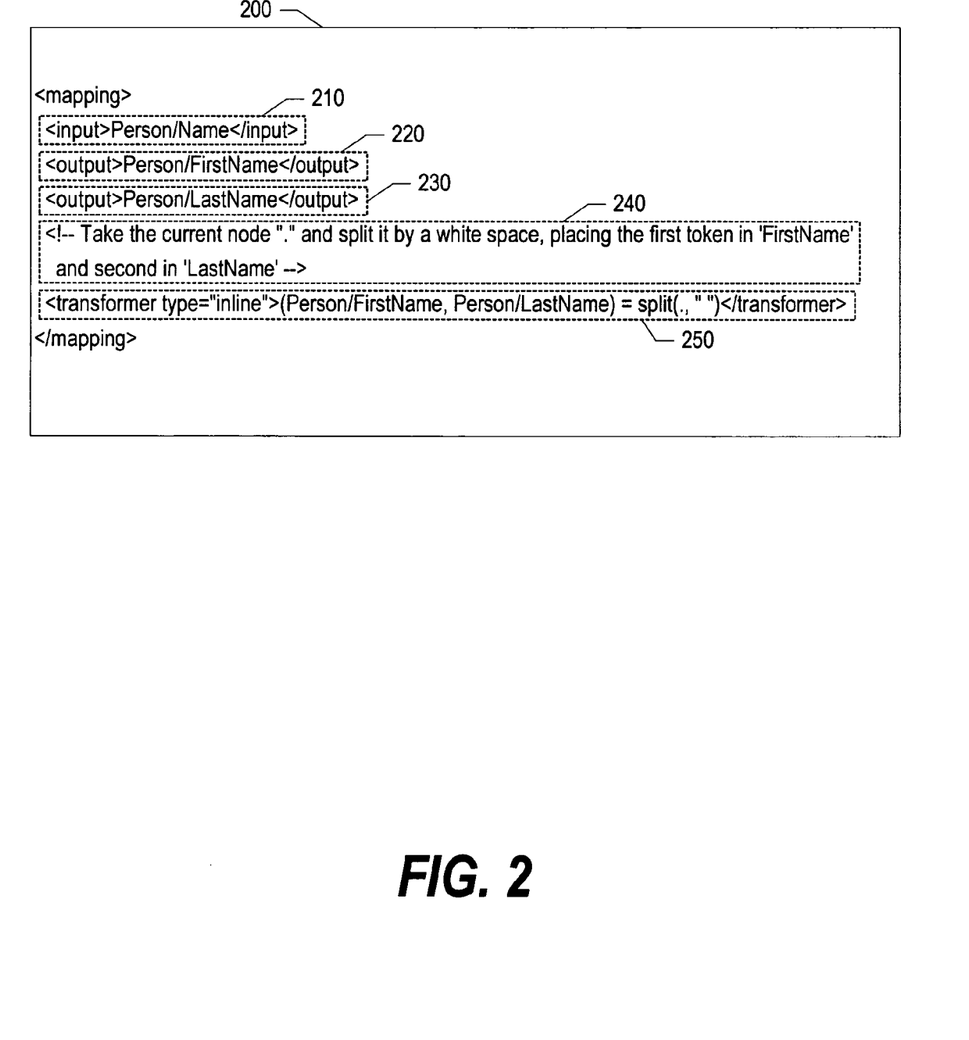
FIG. 2 is a diagram showing an example of a migration mapping definition.

FIG. 2 is a diagram showing an example of a migration mapping definition. As a developer generates edit commands to update an original model, the edit commands are stored in a migration mapping definition. In turn, the migration mapping definition may be deployed, along with the updated model, to an end user. The end user may then use the migration mapping definition to migrate instance data generated by the original model to instance data that is usable by the updated model.

Migration mapping definition 200 includes lines 210 through 250. Line 210 includes an input element "Person/Name" associated with the original model. For example, the input element may correspond to an original model's field that includes the person's first name and last name. Lines 220 and 230 include two output elements associated with the updated model. Line 220 corresponds to a person's first name and line 230 corresponds to a person's last name.

Line 240 includes a comment section that describes the migration mapping definition, which splits a name field from the original model into a first name field and a last name field with a space in between. A developer may add line 240 into the migration mapping definition for commenting purposes. Line 250 includes the transformer type that performs the transformation, which is called "inline." A migration engine uses line 250 to identify a transformer to use in order to split the original model's name field into two fields for the updated model (see FIG. 6 and corresponding text for further details regarding transformer details).

Figure 3:
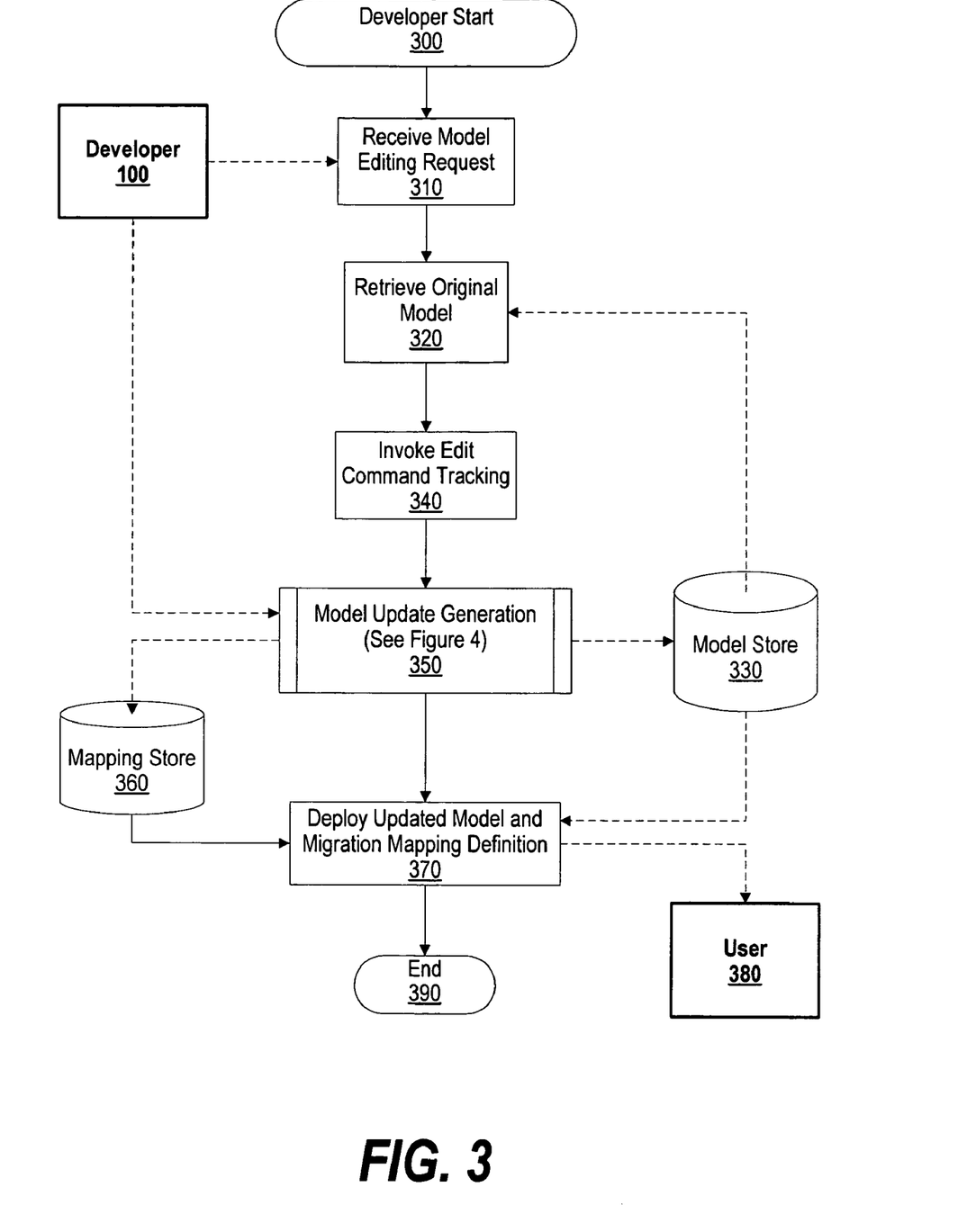
FIG. 3 is a high-level flowchart showing steps taken in updating a model and deploying the updated model along with a migration mapping definition.

FIG. 3 is a high-level flowchart showing steps taken in updating a model and deploying the updated model along with a migration mapping definition. Developer processing commences at 300, whereupon processing receives a model editing request from developer 100 at step 310. For example, developer 100 may wish to update a model for "Software XYZ" from version 1.0 to version 2.0. Developer 100 is the same as that shown in FIG. 1.

Processing, at step 320, receives the original model from model store 330 that corresponds to developer 100's model editing request. Using the example described above, processing receives the model corresponding to software XYZ version 1.0. Model store 330 may be stored on a nonvolatile storage area, such as a computer hard drive. At step 340, processing invokes "edit command tracking," which tracks and logs developer 100's edit commands for updating the original model. Processing updates the original model according to developer 100's edit commands and, in addition, stores the edit commands in a migration mapping definition located in mapping store 360 (pre-defined process block 350, see FIG. 4 and corresponding text for further details). Mapping store 360 may be stored on a nonvolatile storage area, such as a computer hard drive.

Once developer 100 is finished updating the model, processing deploys the updated model, along with the migration mapping definition, to user 380 at step 370. User 380 may use the migration mapping definition to update instance data that was generated using the original model for use with the updated model (see FIGS. 5, 6, and corresponding text for further details). Processing ends at 390.

Figure 4:
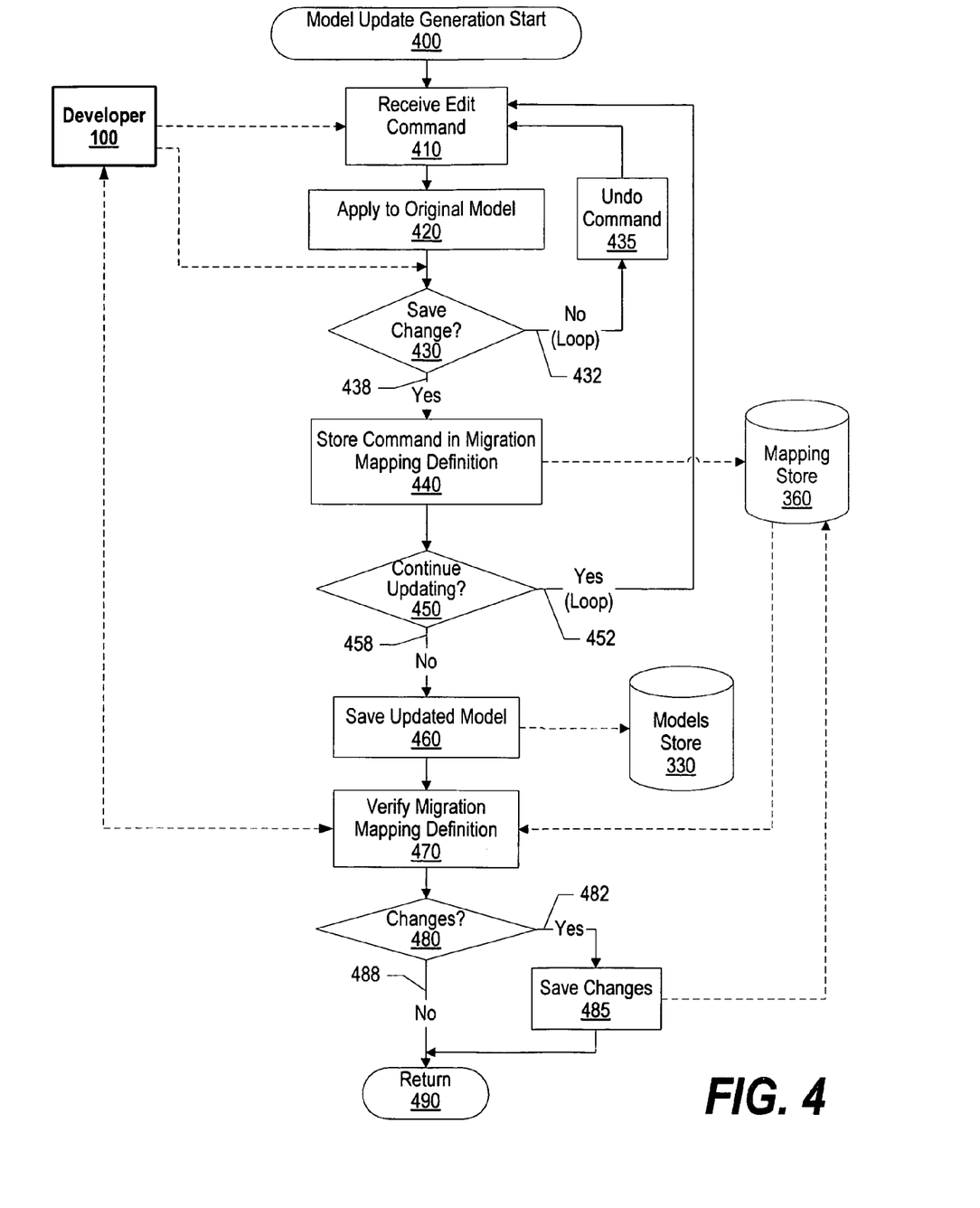
FIG. 4 is a flowchart showing steps taken creating a migration mapping definition based upon model update commands.

FIG. 4 is a flowchart showing steps taken creating a migration mapping definition based upon model update commands. Processing commences at 400, whereupon processing receives an edit command from developer 100 at step 410. For example, developer 100 may wish to split one data field into two data fields. At step 420, processing applies the edit command to the original model.

A determination is made as to whether developer 100 wishes to save the edit command change (decision 430). If developer 100 does not wish to save the edit changes to the original model, decision 430 branches to "No" branch 432 which loops back to undo the edit command at step 435. This looping continues until developer 100 wishes to save changes to the original model, at which point decision 430 branches to "Yes" branch 438.

At step 440, processing stores the edit command in a migration mapping definition that is located in mapping store 360. Using the example described above, processing stores one or more mouse and keyboard commands that developer 100 used to separate the two fields (see FIG. 2 and corresponding text for further details regarding migration mapping definition details). Mapping store 360 is the same as that shown in FIG. 3.

A determination is made as to whether developer 100 wishes to continue to update the original model (decision 450). If developer 100 wishes to continue to update the original model, decision 450 branches to "Yes" branch 452 which loops back to receive and process the next edit command. This looping continues until developer 100 is finished updating the original model, at which point decision 450 branches to "No" branch 458 whereupon processing stores the updated model in models store 330 (step 460). Models store 330 is the same as that shown in FIG. 3, and may be stored on a nonvolatile storage area, such as a computer hard drive.

Developer 100 verifies the migration mapping definition that was generated from the edit commands, located in mapping store 360, at step 470. For example developer 100 may check to see whether additional steps, such as adding spacing between fields, should be added to the migration mapping definition. A determination is made as to whether developer 100 wishes to make changes to the migration mapping definition (decision 480). If developer 100 wishes to make changes to the migration mapping definition, decision 480 branches to "Yes" branch 482 whereupon processing saves the changes to the migration mapping definition at step 485. On the other hand, if developer 100 does not wish to make changes to the migration mapping definition, decision 480 branches to "No" branch 488, bypassing migration mapping definition changing steps. Processing returns at 490.

Figure 5:
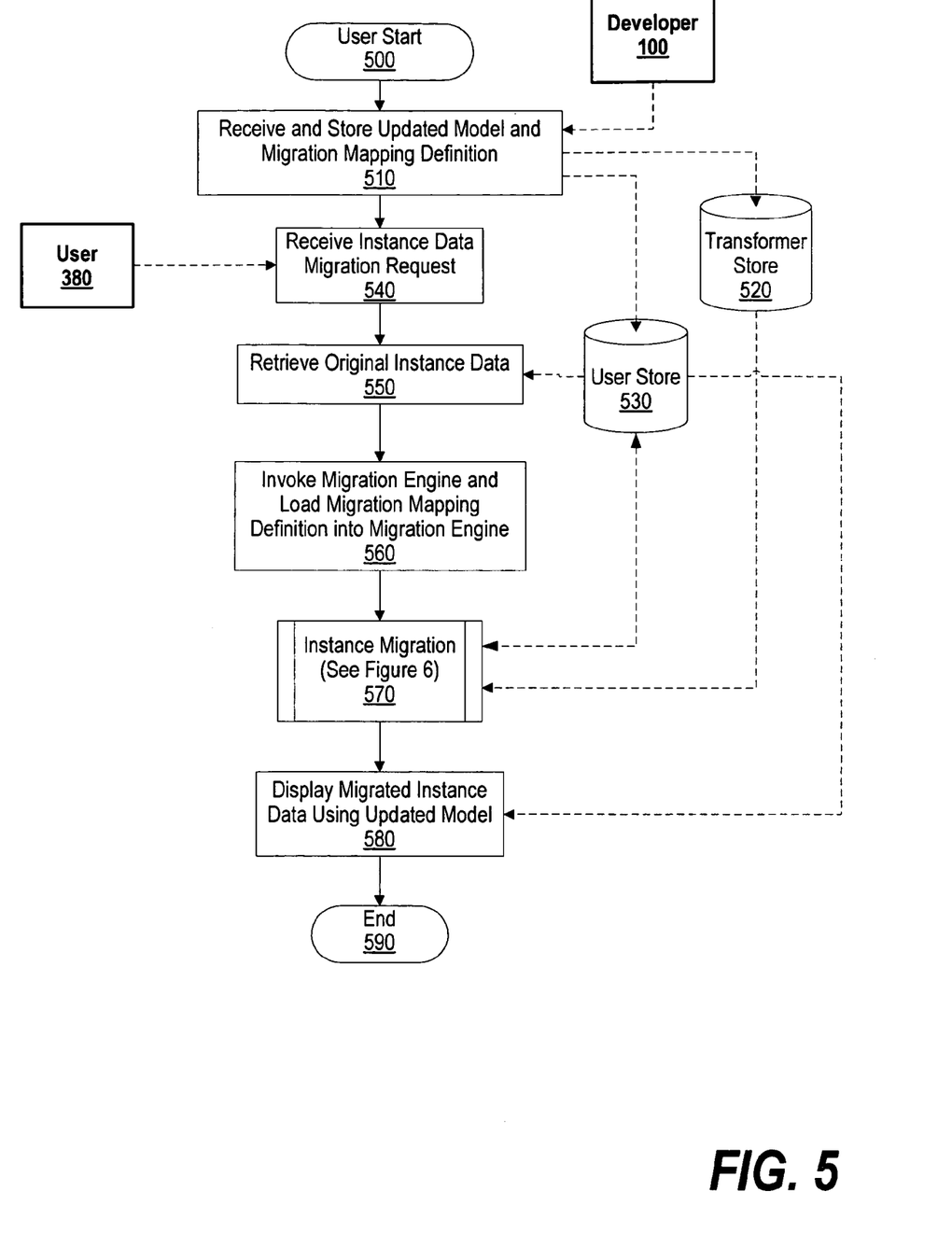
FIG. 5 is a flowchart showing steps taken in a user migrating instance data from an original model to an updated model.

FIG. 5 is a flowchart showing steps taken in a user migrating instance data from an original model to an updated model. Developer 100 updates an "original model," which results in an "updated model," such as updating Software XYZ version 1.0 to Software XYZ version 2.0. During the development, developer 100 invoked edit commands, which were stored in a migration mapping definition (see FIGS. 3, 4, and corresponding text for further details).

Processing commences at 500, whereupon processing receives the updated model and the migration mapping definition from developer 100 at step 510. For example, developer 100 may provide the updated model and the migration mapping definition through a computer network download process, such as through the Internet. The updated model is stored in user store 530 and the migration mapping definition is stored in transformer store 520. User store 530 and transformer store 520 may be stored on a nonvolatile storage area, such as a computer hard drive.

At step 540, processing receives an instance data migration request from user 380. For example, user 380 may have a document that was created in Software XYZ version 1.0 and wish to migrate the instance data to a format that is compatible with Software XYZ version 2.0. Processing retrieves original instance data from user store 530 at step 550. Using the example described above, processing retrieves the instance data that was generated using Software XYZ version 1.0. At step 560, processing invokes a migration engine (e.g., software subroutine) and loads the migration mapping definition into the migration engine. Processing then uses the migration mapping definition to migrate the original instance data to "migrated instance data" that is usable by the updated model (e.g., version 2.0) (pre-defined process block 570, see FIG. 6 and corresponding text for further details).

Once the original instance data is converted to migrated instance data, processing displays the migrated instance data using the updated model at step 580. Using the example describe above, the migrated instance data is displayed using Software XYZ version 2.0. Processing ends at 590.

Figure 6:
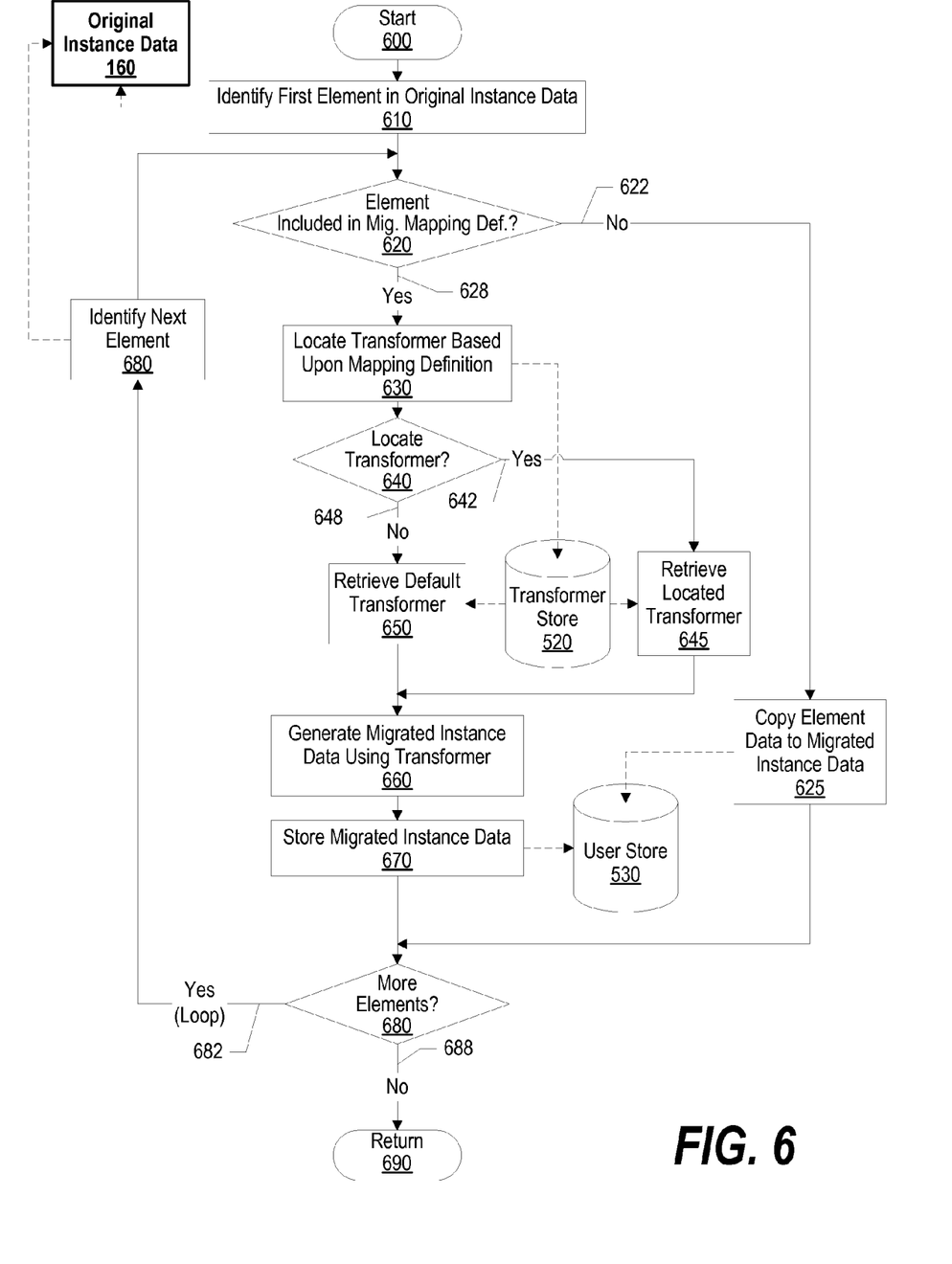
FIG. 6 is a flowchart showing steps taken in using a transformer to convert instance data from one format to a different format.

FIG. 6 is a flowchart showing steps taken in using a transformer to convert instance data from one format to a different format. A user received an updated model and a migration mapping definition from a developer. In turn, the user is able to use the migration mapping definition to migrate original instance data to migrated instance that is usable by the updated model.

Processing commences at 600, whereupon processing identifies a first element in original instance data 160 at step 610. For example, processing may identify a "Person/Name" element that corresponds to a person's first name and last name. Original instance data 160 is the same as that shown in FIG. 1. A determination is made as to whether the identified element is included in the migration mapping definition (decision 620). If the identified model is not included in the migration mapping definition, decision 620 branches to "No" branch 622 whereupon processing copies the element's corresponding data "as is" to the migrated instance data, which is stored in user store 530 (step 625). User store 530 is the same as that shown in FIG. 5.

On the other hand, if the identified element is included in the migration mapping definition, decision 620 branches to "Yes" branch 628 whereupon processing locates a transformer in transformer store 520 that is based upon the migration mapping definition (step 630). For example, the transformer may correspond to reformatting a date field from MM/DD/YY to MM/DD/YYYY. Transformer store 520 is the same as that shown in FIG. 5.

A determination is made as to whether processing located a transformer (decision 640). If processing located a transformer, decision 640 branches to "Yes" branch 642 whereupon processing retrieves the transformer at step 645. On the other hand, if processing did not locate the transformer, decision 640 branches to "No" branch 648 whereupon processing retrieves a default transformer from transformer store 520 at step 650.

At step 660, processing generates migrated instance data using the located or default transformer. Processing, at step 670, stores the migrated instance data corresponding to the element in user store 530 at step 670. A determination is made as to whether original instance data 160 includes more elements to migrate (decision 680). If there are more elements to migrate, decision 680 branches to "Yes" branch 682 which loops back to identify (step 680) and process the next element. This looping continues until there are no more elements to process, at which point decision 680 branches to "No" branch 688. Processing returns at 690.

Figure 7:
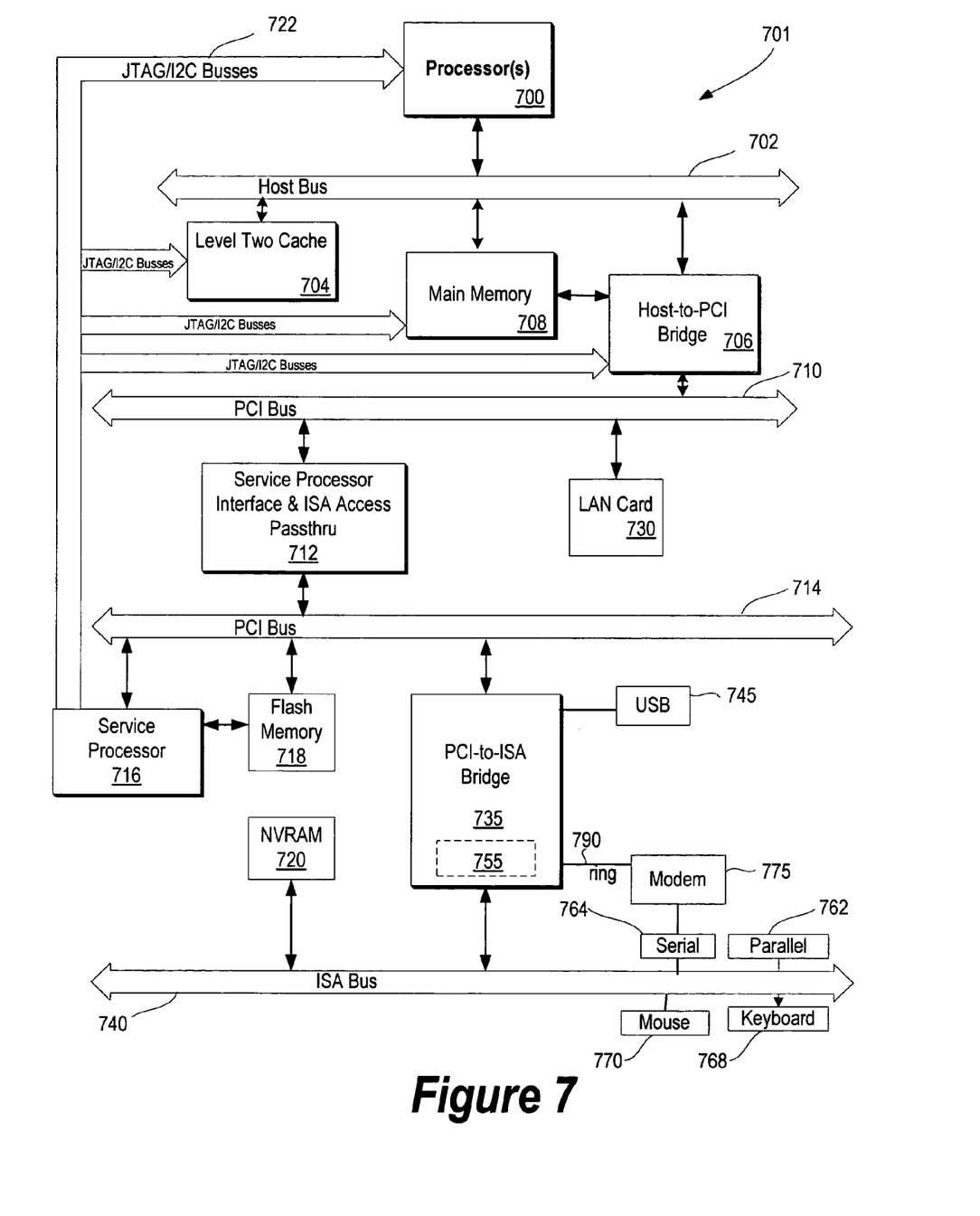
FIG. 7 is a block diagram of a computing device capable of implementing the present invention.

FIG. 7 illustrates information handling system 701 which is a simplified example of a computer system capable of performing the computing operations described herein. Information handling system 701 (e.g., computer system) includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling system 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach information handling system 701 to another computer system to copy files over a network, LAN card 730 is coupled to PCI bus 710. Similarly, to connect information handling system 701 to an ISP to connect to the Internet using a telephone line connection, modem 775 is connected to serial port 764 and PCI-to-ISA Bridge 735.

While FIG. 7 shows one information handling system that employs processor(s) 700, the information handling system may take many forms. For example, information handling system 701 may take the form of a desktop, server, portable, laptop, notebook, or other form factor computer or data processing system. Information handling system 701 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:

invoking an edit command tracker for tracking one or more edit commands initiated by a developer;

receiving one of the edit commands initiated by the developer that modifies a first version of a computer program;

updating the first version of the computer program using the received edit command, the updating resulting in a second version of the computer program that is different than the first version of the computer program;

storing the received edit command into a migration mapping definition, the migration mapping definition utilized to migrate original instance data that is useable by the first version of the computer program to migrated instance data that is useable by the second version of the computer program;

deploying the migration mapping definition and the second version of the computer program to an end user, wherein the deploying results in the migration mapping definition and the second version of the computer program being stored on a computer system corresponding to the end user;

retrieving the original instance data located at the end user's computer system;

loading the migration mapping definition into a migration engine located at the end user's computer system;

converting the original instance data to the migrated instance data using the migration engine and the migration mapping definition at the end user's computer system; and in response to the converting, displaying the migrated instance data using the second version of the computer program at the end user's computer system.

2. The method of claim 1 wherein the converting further comprises:
identifying a first element in the original instance data;
determining that the first element is included in the migration mapping definition;
locating, in response to the determination, a transformer based upon the migration mapping definition; and
generating the migrated instance data using the transformer.

3. The method of claim 2 further comprising:
identifying a second element in the original instance data;
determining that the second element is not included in the migration mapping definition; and
copying data corresponding to the second element to the migrated instance data in response to determining that the second element is not included in the migration mapping definition.

4. The method of claim 1 wherein the converting and the displaying are performed using a model-driven framework.

5. The method of claim 1 further comprising:
receiving one or more changes from a developer in response to the developer verifying the migration mapping definition; and
including the one or more changes in the migration mapping definition.

6. An information handling system comprising:
one or more first processors;
a first memory accessible by at least one of the first processors;
a nonvolatile storage area accessible by at least one of the first processors;
a first set of instructions stored in the first memory and executed by at least one of the first processors in order to perform actions of:
invoking an edit command tracker for tracking one or more edit commands initiated by a developer;
receiving one of the edit commands initiated by the developer that modifies a first version of a computer program;
updating the first version of the computer program using the received edit command, the updating resulting in a second version of the computer program that is different than the first version of the computer program;
storing the received edit command into a migration mapping definition, the migration mapping definition utilized to migrate original instance data that is useable by the first version of the computer program to migrated instance data that is useable by the second version of the computer program; and
deploying the migration mapping definition and the second version of the computer program to an end user;
an end user's computer system, wherein the end user's computer system includes a second processor and a second set of instructions executed by the second processor in order to perform actions of:
storing the migration mapping definition and the second version of the computer program in memory located at the end user's computer system;
retrieving the original instance data located at the end user's computer system;
loading the migration mapping definition into a migration engine located at the end user's computer system;
converting the original instance data to the migrated instance data using the migration engine and the migration mapping definition at the end user's computer system; and
in response to the converting, displaying, on a display, the migrated instance data using the second version of the computer program at the end user's computer system.

7. The information handling system of claim 6 wherein the second set of instructions further performs actions of:
identifying a first element in the original instance data;
determining that the first element is included in the migration mapping definition;
locating, in response to the determination, a transformer based upon the migration mapping definition; and
generating the migrated instance data using the transformer.

8. The information handling system of claim 7 wherein the second set of instructions further performs actions of:
identifying a second element in the original instance data;
determining that the second element is not included in the migration mapping definition; and
copying data corresponding to the second element to the migrated instance data in response to determining that the second element is not included in the migration mapping definition.

9. The information handling system of claim 6 wherein the converting and the displaying are performed using a model-driven framework.

10. The information handling system of claim 6 wherein the first set of instructions further performs actions of:
receiving one or more changes from a developer in response to the developer verifying the migration mapping definition; and
including the one or more changes in the migration mapping definition.

11. A computer program product stored in a computer readable medium, comprising functional descriptive material that, when executed by a first information handling system and a second information handling system:
causes the first information handling system to perform actions that include:
invoking an edit command tracker for tracking one or more edit commands initiated by a developer;
receiving one of the edit commands initiated by the developer that modifies a first version of a computer program;
updating the first version of the computer program using the received edit command, the updating resulting in a second version of the computer program that is different than the first version of the computer program;
storing the received edit command into a migration mapping definition, the migration mapping definition utilized to migrate original instance data that is useable by the first version of the computer program to migrated instance data that is useable by the second version of the computer program; and
deploying the migration mapping definition and the second version of the computer program to an end user;
causes the second information handling system to perform actions that include:
storing the migration mapping definition and the second version of the computer program in memory located at the end user's computer system;
retrieving the original instance data located at the end user's computer system;

loading the migration mapping definition into a migration engine located at the end user's computer system;

converting the original instance data to the migrated instance data using the migration engine and the migration mapping definition at the end user's computer system; and in response to the converting, displaying the migrated instance data using the second version of the computer program at the end user's computer system.

12. The computer program product of claim 11 wherein the second information handling system further performs actions of:

identifying a first element in the original instance data;

determining that the first element is included in the migration mapping definition;

locating, in response to the determination, a transformer based upon the migration mapping definition; and generating the migrated instance data using the transformer.

13. The computer program product of claim 12 wherein the second information handling system further performs actions of:

identifying a second element in the original instance data;

determining that the second element is not included in the migration mapping definition; and copying data corresponding to the second element to the migrated instance data in response to determining that the second element is not included in the migration mapping definition.

14. The computer program product of claim 11 wherein the converting and the displaying are performed using a model-driven framework.

15. The computer program product of claim 11 wherein the first information handling system further performs actions of:

receiving one or more changes from a developer in response to the developer verifying the migration mapping definition; and including the one or more changes in the migration mapping definition.

* * * * *